United States Patent [19]
Kitching et al.

[11] Patent Number: 5,825,165
[45] Date of Patent: Oct. 20, 1998

[54] MICROPOWER SWITCH CONTROLLER FOR USE IN A HYSTERETIC CURRENT-MODE SWITCHING REGULATOR

[75] Inventors: Christopher Kitching, Fort Lauderdale, Fla.; Joseph Vanden Wymelenberg, Mountain View, Calif.

[73] Assignee: Micro Linear Corporation, San Jose, Calif.

[21] Appl. No.: 627,115

[22] Filed: Apr. 3, 1996

[51] Int. Cl.$^6$ ........................................................ G05F 1/56
[52] U.S. Cl. ............................................ 323/282; 323/222
[58] Field of Search .................................... 323/222, 282, 323/284, 273, 274, 907

[56] References Cited

U.S. PATENT DOCUMENTS

| | | | |
|---|---|---|---|
| 3,294,981 | 12/1966 | Bose | 307/88.5 |
| 3,603,809 | 9/1971 | Uchiyama | 307/228 |

(List continued on next page.)

FOREIGN PATENT DOCUMENTS 60-22490   2/1985   Japan ............................................ 5/41

OTHER PUBLICATIONS

U.S. application No. 08/530,081, Mader et al., filed Sep. 19, 1995.
U.S. application No. 08/413,249, Hwang, filed Mar. 30, 1995.
"ML4863 High Efficiency Flyback Controller", Micro Linear Corporation, Feb. 1995.
"ML4863EVAL User's Guide High Efficiency Flyback Controller", Micro Linear Corporation, Feb. 1995.
"Off–Line and One–Cell IC Converters Up Efficiency", Frank Goodenough, Electronic Design, pp. 55–56, 58, 60, 62–64, Jun. 27, 1994.
"Designing with hysteretic current–mode control", Gedaly Levin and Kieran O'Malley, Cherry Semi–Conductor Corp., EDN, pp. 95–96, 98, 100–102, Apr. 28, 1994.
"Analysis of the Flyback Converter Operating in Current–Mode Pulse–Frequency Modulation", Urs Mader and Kit Sum, High Frequency Power Conversion, Apr. 17, 1994.
"Step–Up/Step–Down Converters Power Small Portable Systems", Bruce D. Moore, EDN, pp. 79–84, Feb. 3, 1994.
"ML4861 Low Voltage Boost Regulator", Micro Linear Corporation, Jun. 1993.

(List continued on next page.)

*Primary Examiner*—Matthew V. Nguyen
*Attorney, Agent, or Firm*—Haverstock & Owens LLP

[57] ABSTRACT

A micropower switching regulator for use in a hysteretic current-mode switching mode power converter monitors a fraction of the voltage output to the load in order to maintain the output voltage at a desired level. When the output voltage is less than the desired level, a proportional current is generated, representative of the difference between the output voltage and the desired level, and used to control the switching regulator causing an inductor to alternate between charging to a hysteretic maximum current level and then discharging to a hysteretic minimum current level, controlled by the switching regulator, until the output voltage is greater than the desired level. The hysteretic maximum and minimum current levels vary as the proportional current varies, so that as the difference between the output voltage and the desired voltage increases or decreases, the current level in the inductor will also increase or decrease, responsively. The inductor is charged and discharged continuously during a continuous conduction mode. During a discontinuous conduction or idle mode, the switching regulator is only turned on when necessary to maintain the output voltage at a level equal to or greater than the desired voltage level. Power is only drawn by the switching regulator, from the input source, when the proportional current is generated, because there is a difference between the output voltage and the desired voltage. In this manner the power provided by the input source is conserved and the desired output voltage level is maintained efficiently.

25 Claims, 3 Drawing Sheets

U.S. PATENT DOCUMENTS

| | | | |
|---|---|---|---|
| 3,660,753 | 5/1972 | Judd et al. | 323/22 T |
| 3,883,756 | 5/1975 | Dragon | 307/265 |
| 4,311,954 | 1/1982 | Capel | 323/222 |
| 4,392,103 | 7/1983 | O'Sullivan | 323/222 |
| 4,407,588 | 10/1983 | Arichi et al. | 368/118 |
| 4,437,146 | 3/1984 | Carpenter | 363/21 |
| 4,456,872 | 6/1984 | Froeschle | 323/286 |
| 4,529,927 | 7/1985 | O'Sullivan et al. | 323/222 |
| 4,672,303 | 6/1987 | Newton | 323/285 |
| 4,672,518 | 6/1987 | Murdock | 363/21 |
| 4,677,366 | 6/1987 | Wilkinson et al. | 323/222 |
| 4,691,159 | 9/1987 | Ahrens et al. | 323/222 |
| 4,731,574 | 3/1988 | Melbert | 323/275 |
| 4,736,151 | 4/1988 | Dishner | 323/224 |
| 4,761,725 | 8/1988 | Henze | 363/46 |
| 4,841,220 | 6/1989 | Tabisz et al. | 323/282 |
| 4,845,420 | 7/1989 | Oshizawa et al. | 323/222 |
| 4,920,309 | 4/1990 | Szepesi | 323/269 |
| 4,929,882 | 5/1990 | Szepesi | 323/222 |
| 4,940,929 | 7/1990 | Williams | 323/222 |
| 4,941,080 | 7/1990 | Sieborger | 363/127 |
| 4,947,309 | 8/1990 | Jonsson | 363/17 |
| 4,975,823 | 12/1990 | Rilly et al. | 363/56 |
| 5,028,861 | 7/1991 | Pace et al. | 323/222 |
| 5,034,873 | 7/1991 | Feldtkeller | 363/21 |
| 5,138,249 | 8/1992 | Capel | 323/283 |
| 5,146,399 | 9/1992 | Gucyski | 363/89 |
| 5,278,490 | 1/1994 | Smedley | 323/284 |
| 5,359,281 | 10/1994 | Barrow et al. | 323/284 |
| 5,412,308 | 5/1995 | Brown | 323/267 |
| 5,414,341 | 5/1995 | Brown | 323/268 |
| 5,434,767 | 7/1995 | Batarseh et al. | 363/16 |
| 5,440,473 | 8/1995 | Ishii et al. | 363/21 |
| 5,450,000 | 9/1995 | Olsen | 323/222 |
| 5,457,621 | 10/1995 | Munday et al. | 363/56 |
| 5,457,622 | 10/1995 | Arakawa | 363/59 |
| 5,461,302 | 10/1995 | Garcia et al. | 323/222 |
| 5,479,089 | 12/1995 | Lee | 323/283 |
| 5,481,178 | 1/1996 | Wilcox et al. | 323/287 |
| 5,485,361 | 1/1996 | Sokal | 363/21 |
| 5,491,445 | 2/1996 | Moller et al. | 327/540 |
| 5,502,370 | 3/1996 | Hall et al. | 323/284 |
| 5,532,577 | 7/1996 | Doluca | 323/282 |
| 5,552,695 | 9/1996 | Schwartz | 323/271 |
| 5,565,761 | 10/1996 | Hwang | 323/222 |
| 5,568,041 | 10/1996 | Hesterman | 323/207 |
| 5,592,071 | 1/1997 | Brown | 323/282 |
| 5,592,128 | 1/1997 | Hwang | 331/61 |
| 5,610,502 | 3/1997 | Tallant, II et al. | 323/222 |
| 5,617,306 | 4/1997 | Lai et al. | 363/17 |
| 5,627,460 | 5/1997 | Bazinet et al. | 323/288 |

OTHER PUBLICATIONS

"11. Variable Frequency Converters", K. Kit. Sum, pp. 96–97, 134–135, 1993.

"3.3V/5V/Adjustable Output, Step–Up, DC–DC Converters", Maxim Integrated Products, pp. 1–8, 1993.

"Small–Signal High–Frequency Analysis Of The Free–Running Current–Mode–Controlled Converter", Richard Redl, pp. 897–906, IEEE, 1991.

"Low–Voltage–Input, 3V/3.3V/5V/Adjustable–Output, Step–Up DC–DC Converters", Maxim Integrated Products, pp. 4–189 to 4–191 (no date).

"LT1073 Micropower DC–DC Converter Adjustable and Fixed 5V, 12V", Linear Technology, pp. 4–174 to 4–189, 4–192, (no date).

"System–Engineered Portable Power Supplies Marry Improved Efficiency And Lower Cost", Bruce D. Moore, Maxim Integrated Products (no date).

"Nonlinear–Carrier Control for High Power Factor Rectifiers Based On Flyback, Cuk, or Sepic Converters," R. Zane and D. Maksimovic, Applied Power Electronics Conf., pp. 814–820, 1996.

"Nonlinear–Carrier Control for High Power Factor Boost Rectifiers," D. Maksimovic, Y. Jang, R. Erikson, Applied Power Electronics Conf., pp. 635–641, 1995.

"ML4821 Power Factor Controller," Micro Linear Corporation, Jun. 1992.

"Application Note 16—Theory and Application of the ML4821 Average Current Mode PFC Controller," Micro Linear Corporation, Jan. 1992.

"ML4823 High Frequency Power Supply Controller," Micro Linear Corporation, Dec. 1994.

"CD 54/74 HC 4046A Technical Data," RCA, (no date).

"ML4863 High Efficiency Battery Pack Converter (Preliminary)", Micro Linear Corporation, Jun. 1994.

"ML4880 Portable PC/PCMCIA Power Controller (Preliminary)", Micro Linear Corporation, Oct. 1995.

MICROPOWER SWITCH CONTROLLER FOR USE IN A HYSTERETIC CURRENT-MODE SWITCHING REGULATOR

FIELD OF THE INVENTION

This invention relates to the field of micropower switching regulators for use in battery powered electronic circuits. More particularly, the present invention relates to micropower switching regulators that utilize hysteretic current-mode switching for efficiently drawing power from a battery and for supplying a regulated DC output voltage to a load.

BACKGROUND OF THE INVENTION

Switching regulators generally utilize one or more switches to alternately charge and discharge a magnetic element, usually an inductor or a transformer, for transferring power from an unregulated supply to a load through each switching cycle. A switch controller is responsible for turning the switches on and off in such a way as to control a current in the magnetic element, and, therefore, to control the transfer of energy through the circuit. A feedback loop, generally including a reference level and an error amplifier, senses the output level and adjusts the transfer of power by the switch controller to maintain the desired output level.

In battery powered systems, it is common to find switching regulators that incorporate variable frequency current-mode switch controller designs. Variable frequency controllers have an advantage in that their switching frequency automatically adapts to widely varying load conditions. Under heavy loads the switch controller runs at a maximum frequency and under light loads the controller lowers switching frequency, reducing switching losses. In these types of switching regulators, the quiescent current level becomes important because it determines where efficiency drops-off as the load is reduced. In battery powered circuits with standby and sleep modes, it is not uncommon for the load current to vary by a ratio of more than 100 to 1.

There are three main types of variable frequency current-mode switch controllers: constant on time, constant off time and hysteretic. They can be distinguished by the way they terminate the inductor charge and discharge periods. Constant on time controllers terminate the charge period after a predetermined "on time" has elapsed and terminate the discharge period when the inductor current drops to a predetermined current level. Constant off time controllers function in an opposite manner, terminating the charge cycle at a predetermined inductor current level and terminating the discharge cycle after a predetermined "off time". Hysteretic controllers use a first inductor current level to terminate the charge cycle and a second inductor current level, lower than the first level, to terminate the discharge cycle.

At any given moment in time, a switching regulator will be in one of three states: charging, discharging or idle. In the charging state, energy is transferred from the input to the inductor as the voltage across the inductor causes the inductor current to increase. In the discharging state, energy is transferred from the inductor to the load as the voltage across the inductor causes the inductor current to decrease. A diode may be placed in series with the discharge current path so the inductor current is prevented from reversing direction while discharging, and momentarily remains at zero. When this occurs, the switching regulator is in the idle state, and is considered to be running in discontinuous conduction mode, or DCM. If the inductor current does not reach zero, the switching regulator is said to be running in continuous conduction mode, or CCM.

In battery powered switching regulators, it is common to utilize a variable frequency switching regulator that operates in DCM to preserve battery power under light loads. This is accomplished by extending the idle period to last many times longer than the charge/discharge events, causing the frequency to vary proportionally with the load. In this mode of operation, the efficiency of the charge/discharge event sets the base light-load conversion efficiency of the switching regulator. However, as the frequency of the charge/discharge events becomes lower with even lighter loads, the idle mode quiescent current consumes a significant portion of battery power.

An hysteretic current-mode boost switching regulator of the prior art is illustrated in FIG. 1. A DC input voltage 101 has its negative terminal coupled to ground and its positive input terminal coupled to a first terminal of a resistor 102 and to a first terminal of a resistor 103. A second terminal of the resistor 102 is coupled to an inverting input of an hysteretic comparator 104 and to an output of a transconductance amplifier 105. A second terminal of the resistor 103 is coupled to a non-inverting input of the hysteretic comparator 104 and to a first terminal of an inductor 106. An output of the hysteretic comparator 104 is coupled to a gate of an N-channel MOSFET 107. A source of the MOSFET 107 is coupled to ground and a drain of the MOSFET 107 is coupled to a second terminal of the inductor 106 and to an anode of a Schottky diode 108.

A cathode of the diode 108 is coupled to a first terminal of a capacitor 109, to a first terminal of a resistor 110 and to a first terminal of a load 112. A second terminal of the capacitor 109 is coupled to ground. A second terminal of the resistor 110 is coupled to an inverting input of the transconductance amplifier 105 and to a first terminal of a resistor 111. A second terminal of the resistor 111 is coupled to ground. A non-inverting input of the transconductance amplifier 105 is coupled to a DC reference voltage REF. A second terminal of the load 112 is coupled to ground.

The switching regulator of FIG. I converts an unregulated input voltage VIN, provided by the voltage source 101, into a desired output voltage VOUT, which is applied across the load 112. The output voltage VOUT is maintained at a desired level through negative feedback. The resistor 110 and the resistor 11 form a voltage divider that places a predetermined fraction of the load voltage VOUT at the inverting input of the transconductance amplifier 105. If the voltage at the inverting input of the transconductance amplifier 105 is less than the reference voltage at the non-inverting input of the transconductance amplifier 105, the tranconductance amplifier output current ISET increases in the direction indicated in FIG. 1 (into the output of transconductance amplifier 105). The current ISET flows through the resistor 102 causing the voltage across the inputs of the hysteretic comparator 104 to increase. When this comparator input voltage differential becomes large enough to overcome the input hysteresis, the comparator output goes to a logical high voltage and turns on the N-channel MOSFET 107, which brings the second terminal of the inductor 106 to near ground. This causes the inductor current IL to begin increasing, and the switching regulator is in the charging state, as previously described. As the inductor current IL increases, it creates a voltage drop across resistor 103 that causes the input voltage differential of the hysteretic comparator 104 to get smaller, counteracting the effect of ISET. Eventually, IL becomes large enough to cause the output of the hysteretic comparator 104 to go low, turning the N-channel MOSFET 107 off. At this point in time, the inductor current IL forces the drain of the N-channel MOS- FET 107 to a higher voltage until the Schottky diode 108 forward-biases and IL is conducted to the capacitor 109 and to the load 112. The voltage across the inductor 106 now has a polarity to cause IL to decrease, and the switching regulator is in the discharging state, as previously described.

When the inductor current IL falls to a low enough level that ISET is again able to trip the hysteretic comparator 104 output to be a logical high voltage, the N-channel MOSFET is turned on and a new charging cycle begins. It can be seen that, for a given value of ISET, the switching will be controlled such that the inductor current IL ramps up and down between two trip levels of the hysteretic comparator 104 such that the hysteresis current is related to the hysteresis of the hysteretic comparator 104 and to the value of the resistor 103. This relationship is given by:

$$IL(HYS)=VHYS(104) \times R(103).$$

The average value of IL will be related to ISET and to the values of resistors 102 and 103. The average value of IL is given by:

$$IL(AVG)=ISET(AVG) \times R(103)/R(102).$$

During the discharge period, the inductor current IL is delivered to the output capacitor 109 and to the load 112, boosting the output voltage VOUT. As VOUT varies, the feedback network adjusts IL to bring VOUT back to the desired regulation point. During the discharge period, current is conducted through the Schottky diode 108. If the lower trip level set by ISET drops below zero, the diode will block IL from conducting current in the reverse direction and switching will cease. At this point, the switching regulator enters the idle state previously described. Both terminals of the inductor 106 come to rest at a voltage equal to VIN and no more switching occurs until ISET increases enough to trip the hysteretic comparator 104 to a logical high voltage. The output capacitor 109 acts as a second storage element to supply the load 112 with power. When the load is light, the regulator can remain in this idle state for long periods of time, wherein the quiescent current of the regulator becomes significant, as previously discussed.

The quiescent current of the regulator in the idle state is related to the sum of the currents in the feedback resistors 110 and 111, the quiescent current in the transconductance amplifier 105, and in the hysteretic comparator 107. The current in the resistors 110 and 111, can be reduced somewhat by increasing the value of resistors 110 and 111. This can only be done to a certain point, however, as parasitic capacitance and leakage currents become a problem. The quiescent current in the transconductance amplifier 105 can also be minimized to a certain degree. Such techniques are used in the design of integrated circuits available from Micro Linear Corporation, located at 2092 Concourse Drive, in San Jose, Calif., Zip Code 95131, under part numbers ML4871, ML4872, and ML4865. These techniques, however, can only go so far in reducing the power consumed by the regulator, especially in the idle state.

Therefore, what is needed, especially for battery powered devices, is a switching regulator of variable frequency design, capable of delivering peak output load currents, and having high DCM efficiency while drawing low quiescent current during the idle state, in which the switching regulator may remain during much of its operating time.

SUMMARY OF THE INVENTION

A micropower switching regulator for use in an hysteretic current-mode switching mode power converter monitors a fraction of the voltage output to the load in order to maintain the output voltage at a desired level. When the output voltage is less than the desired level, a proportional current is generated, representative of the difference between the output voltage and the desired level, and used to control the switching regulator, causing an inductor to alternate between charging to a hysteretic maximum current level and then discharging to a hysteretic minimum current level, controlled by the switching regulator, until the output voltage is greater than the desired level. The hysteretic maximum and minimum current levels vary as the proportional current varies, so that as the difference between the output voltage and the desired voltage increases or decreases, the current level in the inductor will also increase or decrease, responsively. The inductor is charged and discharged continuously during a continuous conduction mode. During a discontinuous conduction or idle mode, the switching regulator is only turned on when necessary to maintain the output voltage at a level equal to or greater than the desired voltage level. Power is only drawn by the switching regulator, from the input source, when the proportional current is generated, because there is a difference between the output voltage and the desired voltage. In this manner, the power provided by the input source is conserved and the desired output voltage level is maintained efficiently.

DETAILED DESCRIPTION OF THE PREFERRED EMBODIMENT

Figure 1:
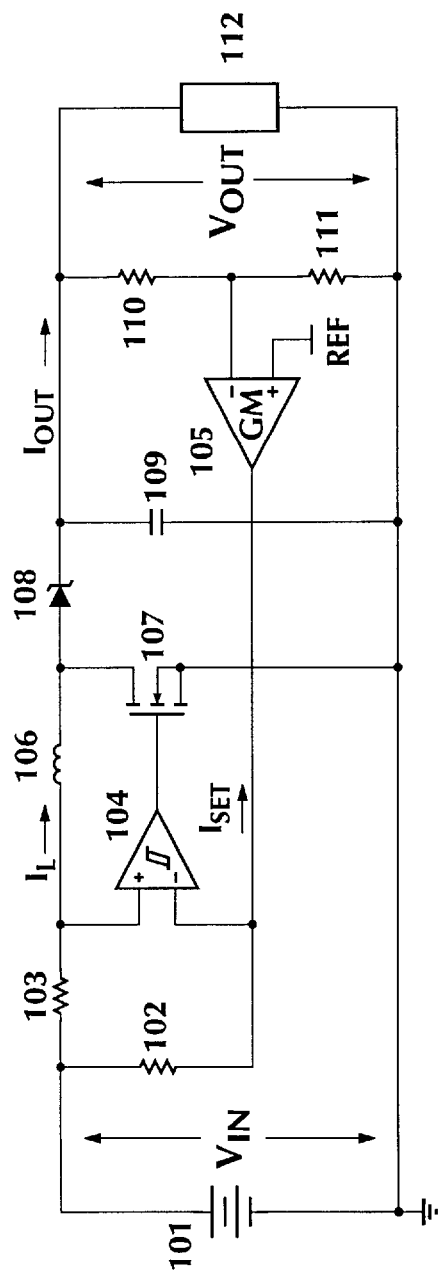
FIG. 1 illustrates a schematic diagram of a DC to DC switching mode power converter of the prior art.
Figure 2:
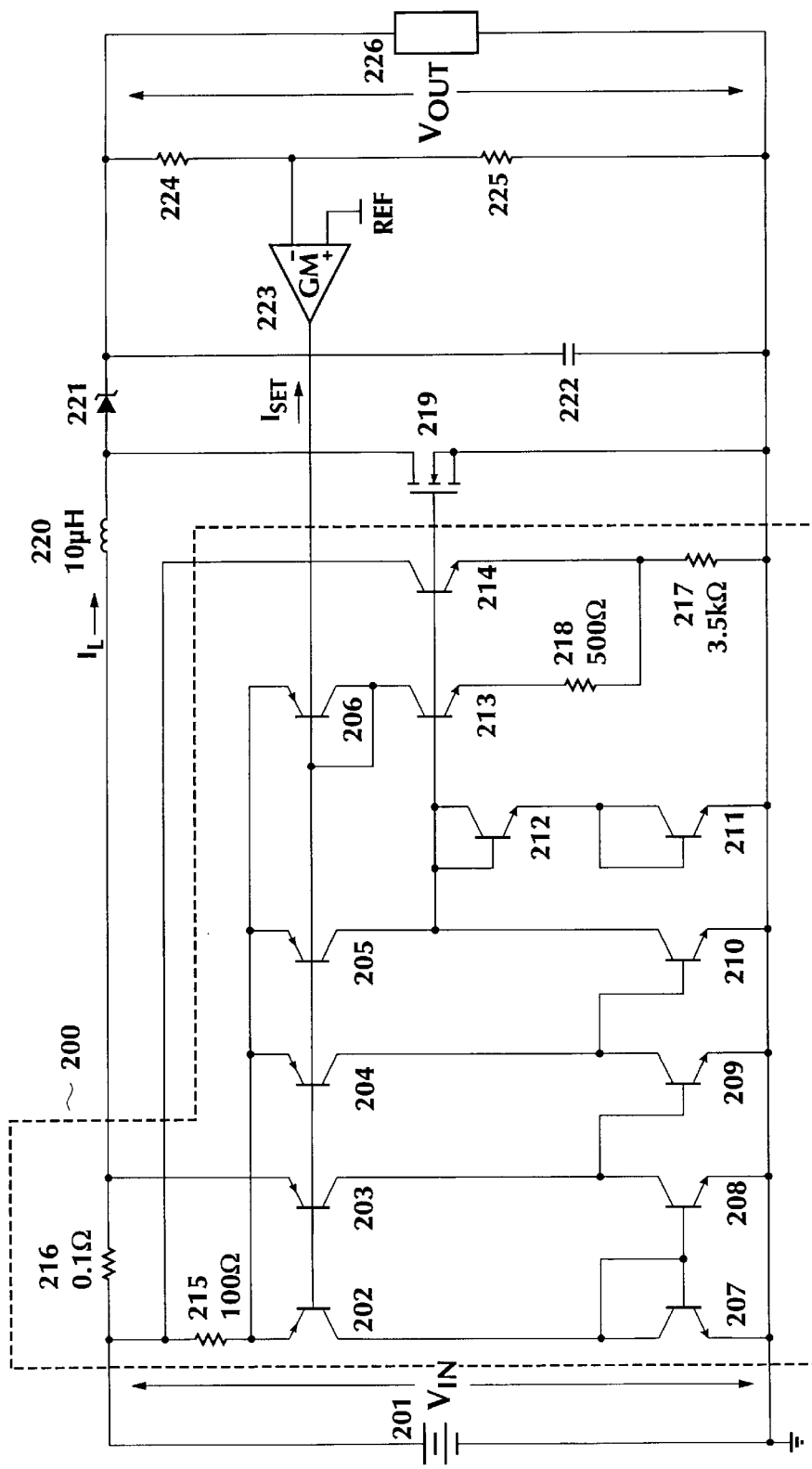
FIG. 2 illustrates a schematic diagram of the micropower switch circuitry of the preferred embodiment of the present invention, for use within a switching mode power converter.
Figure 3:
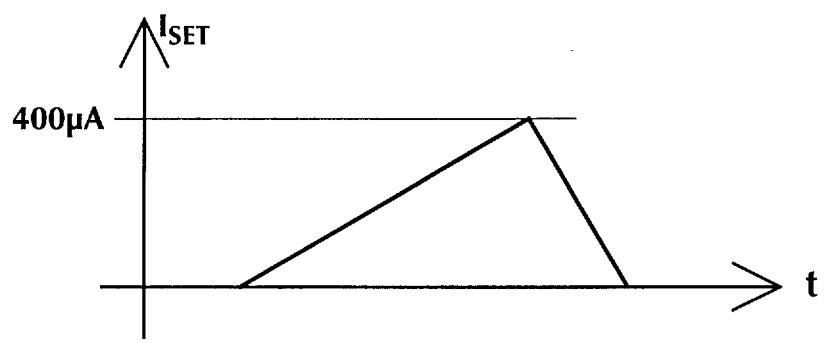
FIG. 3 illustrates a waveform of the current drawn by the amplifier within the micropower switch of the present invention in relation to time.
Figure 4:
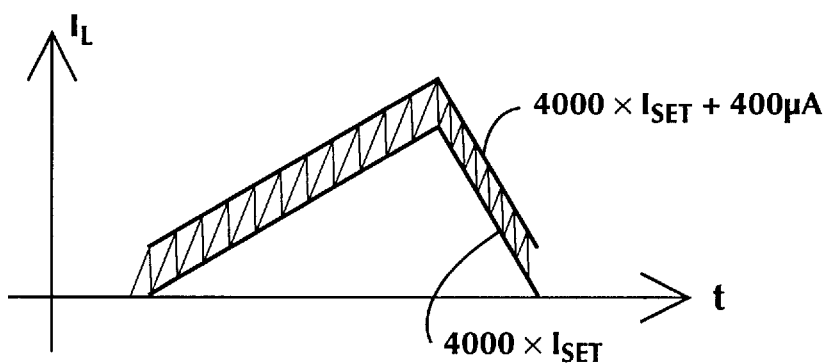
FIG. 4 illustrates a waveform corresponding to the waveform illustrated in FIG. 3, and illustrating the current flowing through the inductor according to the present invention.

A detailed schematic diagram of a switching regulator including the micropower switch controller circuit 200 of the present invention is illustrated in FIG. 2. The regulator of FIG. 2 has similarities to the regulator shown in FIG. 1. A difference being that the hysteretic comparator 104 of FIG. 1 is absent. Instead, the regulator shown in FIG. 2 includes the micropower switch controller circuit 200 of the present invention.

In the circuit illustrated in FIG. 2, the micropower switch controller circuit 200 is illustrated within the dotted lines and includes transistors 202–214 and resistors 215–218. An unregulated DC input voltage source 201 has a negative terminal coupled to ground and a positive terminal coupled to a first terminal of a resistor 215 (100 ohms), to a first terminal of a resistor 216 (0.1 ohms) and to a collector of an NPN transistor 214. A second terminal of the resistor 215 is coupled to an emitter of a PNP transistor 202, to an emitter of a PNP transistor 204, to an emitter of a PNP transistor 205 and to an emitter of a PNP transistor 206. A base of the PNP transistor 202 is coupled to a base of a PNP transistor 203, to a base of a PNP transistor 204, to a base of a PNP transistor 205, to a base and to a collector of a PNP transistor 206, to a collector of an NPN transistor 213 and to an output of a transconductance amplifier 223.

A collector of the PNP transistor 202 is coupled to a base and to a collector of an NPN transistor 207 and to a base of an NPN transistor 208. A collector of the PNP transistor 203 is coupled to a collector of the NPN transistor 208 and to a base of an NPN transistor 209. A collector of the PNP transistor 204 is coupled to a collector of the NPN transistor 209 and to a base of an NPN transistor 210. A collector of the PNP transistor 205 is coupled to a collector of an NPN transistor 210, to a base and to a collector of an NPN transistor 212, to a base of an NPN transistor 213, to a base of an NPN transistor 214 and a gate of an N-channel MOSFET 219. An emitter of the NPN transistor 212 is coupled to a base and to a collector of an NPN transistor 211. An emitter of the NPN transistor 207, an emitter of the NPN transistor 208, an emitter of the NPN transistor 209, an emitter of the NPN transistor 210 and an emitter of the NPN transistor 211 are coupled to ground. An emitter of the NPN transistor 213 is coupled to a first terminal of a resistor 218 (500 ohms). An emitter of the NPN transistor 214 is coupled to a second terminal of the resistor 218 and to a first terminal of a resistor 217 (3.5 Kohms). A second terminal of the resistor 217 is coupled to ground.

A second terminal of the resistor 216 is coupled to an emitter of the PNP transistor 203 and to a first terminal of an inductor 220. A second terminal of the inductor 220 is coupled to a drain of the N-Channel MOSFET 219 and to an anode of a Schottky diode 221. A source of the N-channel MOSFET 219 is coupled to ground. A cathode of the Schottky diode 221 is coupled to a first terminal of a capacitor 222, to a first terminal of a resistor 224 and to a first terminal of a load 226. A second terminal of the capacitor 222 is coupled to ground. A second terminal of the resistor 224 is coupled to an inverting input of the transconductance amplifier 223 and to a first terminal of a resistor 225. A non-inverting input of the transconductance amplifier is coupled to a DC reference voltage, REF. A second terminal of the resistor 225 and a second terminal of the load 226 are coupled to ground.

The Charge Cycle

When the current ISET is zero, the circuit shown in FIG. 2 remains in an idle state with the currents in all the NPN and PNP transistors at zero. As VOUT drops below the desired output voltage level, ISET becomes positive and forward biases the PNP transistors 202–206 with most of ISET flowing through the PNP transistor 206. The collector current of the PNP transistor 206 is duplicated by the collector currents of the PNP transistors 202, 204 and 205. The current flowing in the resistor 215 creates a small voltage drop that lowers the emitter voltages of the PNP transistors 202, 204, 205 and 206 below that of PNP transistor 203. Because the bases of the PNP transistors 202–206 are coupled together, and no inductor current IL is flowing yet, the current in the PNP transistor 203 will exceed the current flowing in the PNP transistor 202.

The NPN transistors 207 and 208 form a current mirror, such that the collector current of PNP transistor 202 is subtracted from the collector current of PNP transistor 203, and the difference is delivered to the base of the NPN transistor 209. Because the collector current in the PNP transistor 203 exceeds the collector current in the PNP transistor 202, the NPN transistor 209 is turned on and its collector pulls the base of the NPN transistor 210 to near ground ensuring that the NPN transistor 210 is off. Because the NPN transistor 210 is off, the collector current of the PNP transistor 205 flows through the NPN transistors 212 and 211 to ground, raising the base voltages of the NPN transistors 213 and 214 and the gate voltage of the N-channel MOSFET 219 to approximately 1.4 Volts, or two Vbe's.

When the bases of the NPN transistors 213 and 214 are raised to 1.4 Volts, or two Vbe's, the voltage across resistor 217 becomes 0.7 Volts, or one Vbe, causing a 200 uA current from the NPN transistors 213 and 214 to flow through the resistor 217. The NPN transistor 213 is six times the size of the NPN transistor 214, and is, therefore, six times more conductive. However, a resistor 218 is coupled to the emitter of the NPN transistor 213, reducing its conductance and causing the 200 uA current in the resistor 217 to split equally, so 100 uA flows through each of the NPN transistors 213 and 214 at room temperature. The sizes of the NPN transistors 213 and 214 are mismatched in order to achieve a reasonably constant current over temperature in the collector of the transistor 213. As temperature increases, the voltage across the resistor 217, one Vbe, will drop, as will the current in the resistor 217. But the size offset between the NPN transistors 213 and 214 will increase, causing more current to flow into the NPN transistor 213 than into the NPN transistor 214. The desired result is that the collector current of the NPN transistor 213 stays approximately constant, to a first order, with temperature, while the collector current of the NPN transistor 214 tends to drop dramatically as temperature increases.

The 100 uA current flowing in the NPN transistor 213 reinforces the control current ISET, creating a positive feedback, or hysteresis, effect at the resistors 215 and 216. The total current flowing in the resistor 215 is given by:

$$IR215(CHARGE)=4\times(ISET+100\ uA).$$

Because the N-channel MOSFET 219 is on, holding the second terminal of the inductor 220 near ground, the inductor current IL starts to increase. The switch controller circuit 200 holds the N-channel MOSFET 219 on until the inductor current IL builds enough voltage drop across the current sense resistor 216 to match the drop across the resistor 215. When the inductor current reaches a peak value of:

$$IL(PEAK)=4\times(ISET+100\ uA)\times(R215/R216),$$

the voltage at the emitters of the PNP transistors 202 and 203 are equal, and the switch controller 200 pulls the gate of the N-channel MOSFET 219 to ground, beginning the discharge cycle.

The Discharge Cycle

When the emitter voltage of the PNP resistor 203 is below the emitter voltage of the PNP transistor 202, the collector current of the PNP transistor 202 exceeds that of the PNP transistor 203. Therefore, the current mirror formed by NPN transistors 207 and 208 holds the base of NPN transistor 209 to near ground. Because the NPN transistor 209 is off, the collector current of the PNP transistor 204 drives the base of the NPN transistor 210, which turns it on. When the NPN transistor 210 turns on, the base voltage of the NPN transistors 213 and 214 and the gate voltage of the N-channel MOSFET 219 are pulled to near ground. This causes the 100 uA hysteresis current in the NPN transistor 213 to be shut-off, which creates a positive feedback effect by increasing the differential voltage at the emitters of the PNP transistors 202 and 203. The voltage across the resistor 215 is now given by:

$$IR215(DISCHARGE)=4\times ISET.$$

Because the N-channel MOSFET 219 is off, the inductor current IL is forced to flow through the Schottky diode 221 to the output node. This causes the output voltage VOUT to rise, as current is delivered to the load and to the capacitor 222. As the inductor discharges, the voltage across the inductor now has a polarity to reduce the inductor current IL. The inductor current will continue to drop until the voltage across the current sense resistor 216 matches the drop across the resistor 215. At this point, the emitter voltage of the PNP transistor 203 becomes higher than the emitter voltage of the PNP transistor 202, and another charge cycle begins. This will occur at an inductor valley current given by:

$$I(VALLEY)=4\times ISET\times(R215/R216).$$

It can be seen that, for a constant value of ISET, the inductor current will ramp up and down between the peak and valley inductor currents. The hysteresis current in the inductor will be given by:

$$IL(HYS)=4\times 100\ uA\times(R215/R216),$$

or about 400 mA in the example shown. Because the output voltage VOUT usually has a filter capacitor 222 coupled to it, the control current ISET usually moves fairly slowly compared to the switching frequency and a relatively constant inductor hysteresis current is obtained.

The Idle Period

Under light loads, the output voltage may drift slightly above the desired output level after a discharge cycle, and ISET will be zero. Under these conditions, the switch controller 200 automatically enters the idle state, where the inductor current remains at zero. Under these conditions, the switch controller 200 draws no quiescent power, making it an ideal solution for battery powered applications. The output capacitor 222 acts as a storage element and provides power to the load during this period. The switch controller 200 will remain in this state until the load voltage drops and the ISET current becomes positive.

In contrast to the switch controllers of the prior art, the switch controller 200 of the present invention is highly efficient in periods of light load because of the lack any quiescent power draw during the idle periods. Also, the switch controller remains ready to deliver power to the load instantaneously upon the demand of the feedback control circuit. The switch controller 200 according to the invention may allow some battery operated devices to operate at low currents for extended periods of time without replacing or recharging batteries. In addition, techniques such as utilizing higher value resistors for the feedback resistors 224 and 225, and utilizing a low quiescent current transconductance amplifier 223, may be employed with the switch controller 200 according to the invention.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiments chosen for illustration without departing from the spirit and scope of the invention.

Specifically, it will be apparent to one of ordinary skill in the art that the device of the present invention could be implemented in several different ways and the apparatus disclosed above is only illustrative of the preferred embodiment of the invention and is in no way a limitation. For example, it would be within the scope of the invention to vary the values of the various components and voltage levels disclosed herein. It will be apparent that transistors of one type, such as NMOS, PMOS, bipolar NPN or bipolar PNP can be interchanged with a transistor of another type, and in some cases interchanged with diodes, with appropriate modifications, and so forth.

We claim:

1. A power supply circuit for providing a regulated voltage level by drawing power from a power source, the power supply circuit comprising:
    a. a switch coupled to charge a magnetic element with energy by drawing an input current from the power source and coupled to discharge the magnetic element into a charge storage device for forming the regulated voltage level across the charge storage device;
    b. an error amplifier coupled to compare the regulated voltage level to a reference level; and
    c. a control circuit coupled to control the switch according to an output of the error amplifier and according to a level of the input current wherein the control circuit does not draw any quiescent current when the regulated voltage level is higher than the reference level.

2. The power supply circuit according to claim 1 wherein the error amplifier provides a control signal to the control circuit wherein the control circuit is responsive to the control signal only when the regulated voltage level is lower than the reference level.

3. The power supply circuit according to claim 1 wherein the error amplifier provides a control current to the control circuit wherein the control current is representative of a difference between the regulated voltage level and the reference level only when the regulated voltage level is lower than the reference level.

4. The power supply circuit according to claim 3 wherein the control circuit turns on the switch when the current through the inductor reaches a lower threshold and turns off the switch when the current through the inductor reaches an upper threshold.

5. The power supply circuit according to claim 4 wherein the lower and upper thresholds vary according to a difference between the regulated voltage level and the reference level.

6. The power supply circuit according to claim 5 wherein a difference between the lower and upper thresholds remains substantially constant despite variations in the difference between the regulated voltage level and the reference level.

7. The power supply circuit according to claim 6 wherein the difference between the lower and upper thresholds remains substantially constant despite variations in temperature.

8. The power supply circuit according to claim 1 wherein the control circuit comprises a plurality of transistors and resistors, all of which are non-conducting when the regulated voltage level is higher than the reference level.

9. The power supply circuit according to claim 1 wherein the error amplifier comprises a transconductance amplifier for forming a control current wherein the control current has a level other than substantially zero only when the regulated voltage level is lower than the reference level.

10. The power supply circuit according to claim 9 wherein the control circuit is coupled to receive the control current from the transconductance amplifier via an input node of the control circuit wherein the input node comprises a control terminal of a transistor wherein the transistor constrains the control current signal to a single polarity.

11. The power supply circuit according to claim 10 wherein the transistor is a bipolar transistor and the control terminal is a base of the bipolar transistor.

12. The power supply circuit according to claim 11 wherein a collector of the bipolar transistor is coupled to the base of the bipolar transistor.

13. The power supply circuit according to claim 1 wherein the control circuit turns on the switch when the current through the inductor reaches a lower threshold and turns off the switch when the current through the inductor reaches an upper threshold.

14. The power supply circuit according to claim 13 wherein the lower and upper thresholds vary according to a difference between the regulated voltage level and the reference level.

15. The power supply circuit according to claim 14 wherein a difference between the lower and upper thresholds remains substantially constant despite variations in the difference between the regulated voltage level and the reference level.

16. The power supply circuit according to claim 15 wherein the difference between the lower and upper thresholds remains substantially constant despite variations in temperature.

17. A power supply circuit for providing a regulated voltage level by drawing power from a power source, the power supply circuit comprising:
   a. a switch coupled to charge a magnetic element with energy by drawing an input current from the power source and coupled to discharge the magnetic element into a charge storage device for forming the regulated voltage level across the charge storage device;
   b. an error amplifier coupled to compare the regulated voltage level to a reference level; and
   c. a control circuit coupled to control the switch according to an output of the error amplifier wherein the control circuit does not draw any quiescent current when the regulated voltage level is higher than the reference level.

18. The power supply circuit according to claim 17 wherein the error amplifier provides a control signal to the control circuit wherein the control circuit is responsive to the control signal only when the regulated voltage level is lower than the reference level.

19. The power supply circuit according to claim 17 wherein the error amplifier provides a control signal to the control circuit wherein the control signal is representative of a difference between the regulated voltage level and the reference level only when the regulated voltage level is lower than the reference level.

20. The power supply circuit according to claim 17 wherein the control circuit comprises a plurality of transistors and resistors, all of which are non-conducting when the regulated voltage level is higher than the reference level.

21. The power supply circuit according to claim 17 wherein the error amplifier comprises a transconductance amplifier for forming a control current wherein the control current has a level other than substantially zero only when the regulated voltage level is lower than the reference level.

22. The power supply circuit according to claim 21 wherein the control circuit is coupled to receive the control current from the transconductance amplifier via an input node of the control circuit wherein the input node comprises a control terminal of a transistor wherein the transistor constrains the control current signal to a single polarity.

23. The power supply circuit according to claim 22 wherein the transistor is a bipolar transistor and the control terminal is a base of the bipolar transistor.

24. The power supply circuit according to claim 23 wherein a collector of the bipolar transistor is coupled to the base of the bipolar transistor.

25. A switch for a hysteretic current-mode switching regulator having an input and an output comprising:
   a. a first pnp bipolar transistor having a first base, a first emitter, and a first collector;
   b. a second pnp bipolar transistor having a second base coupled to the first base, a second emitter, and a second collector;
   c. a third pnp bipolar transistor having a third base coupled to the first base, a third emitter coupled to the first emitter, and a third collector;
   d. a fourth pnp bipolar transistor having a fourth base coupled to the first base, a fourth emitter coupled to the first emitter, and a fourth collector;
   e. a fifth pnp bipolar transistor having a fifth base coupled to the first base, a fifth emitter coupled to the first emitter, and a fifth collector coupled to the fifth base;
   f. a base reference voltage;
   g. a sixth npn bipolar transistor having a sixth base, a sixth emitter coupled to the base reference voltage, and a sixth collector coupled to the sixth base and the first collector;
   h. a seventh npn bipolar transistor having a seventh base coupled to the sixth base, a seventh emitter coupled to the base reference voltage, and a seventh collector coupled to the second collector;
   i. an eighth npn bipolar transistor having an eighth base coupled to the seventh collector, an eighth emitter coupled to the base reference voltage, and an eighth collector coupled to the third collector;
   j. a ninth npn bipolar transistor having a ninth base coupled to the eighth collector, a ninth emitter coupled to the base reference voltage, and a ninth collector coupled to the fourth collector;
   k. a tenth npn bipolar transistor having a tenth base, a tenth emitter coupled to the base reference voltage, and a tenth collector coupled to the tenth base;
   l. an eleventh npn bipolar transistor having an eleventh base coupled to the fourth collector, an eleventh emitter coupled to the tenth collector, and an eleventh collector coupled to the eleventh base;
   m. a twelfth npn bipolar transistor having a twelfth base coupled to the fourth collector, a twelfth emitter, and a twelfth collector coupled to the fifth collector;
   n. a thirteenth npn bipolar transistor having a thirteenth base coupled to the twelfth base, a thirteenth emitter, and a thirteenth collector coupled to the first emitter;
   o. a fourteenth NMOS transistor having a fourteenth gate coupled to the thirteenth base, a fourteenth source coupled to the base reference voltage, and a fourteenth drain forming a switch having an on position and an off position;
   p. a first resistor coupling the input to the second emitter;
   q. a second resistor coupling the input to the first emitter;
   r. a third resistor coupling the twelfth emitter to the thirteenth emitter;
   s. a fourth resistor coupling the thirteenth emitter to the base reference voltage;
   t. an inductor coupling the second emitter to the fourteenth drain for storing energy when the fourteenth transistor is in the on position;

u. a rectifying diode having an anode and a cathode, the cathode coupled to the fourteenth drain, the anode coupled to the output;

v. a capacitor coupling the output to the base reference voltage the capacitor for storing energy from the inductor when the fourteenth transistor is in the off position and for providing energy to a load when the fourteenth transistor is in the on position;

w. a fifth resistor having a first and second terminal, the first terminal coupled to the output;

x. a sixth resistor coupling the second terminal to the base reference voltage;

y. an output reference voltage; and z. a transconductance amplifier having a positive input node, a negative input node and a transconductance output node; the positive input node coupled to the output reference voltage, the negative input node coupled to the second terminal, and the transconductance output node coupled to the first base.

* * * * *

UNITED STATES PATENT AND TRADEMARK OFFICE
CERTIFICATE OF CORRECTION

PATENT NO. : 5,825,165

DATED : October 20, 1998

INVENTOR(S) : Christopher Kitching et al.

It is certified that error appears in the above-identified patent and that said Letters Patent is hereby corrected as shown below:

On the title page, item [56]:

IN THE REFERENCES CITED:

In references to patent number 4,392,103, delete "O'Sullivan" and insert --O'Sullivan et al--.

In column 2, line 43, delete "the resistor 11" and insert --the resistor 111--.

In column 2, lines 60 and 61, delete "state, as previously described. As the inductor current IL" and insert
--state, as previously described.
As the inductor current IL--.

Signed and Sealed this

Sixth Day of April, 1999

Attest:

Attesting Officer

Q. TODD DICKINSON

Acting Commissioner of Patents and Trademarks